(12) United States Patent
Stephens et al.

(10) Patent No.: US 9,042,309 B2
(45) Date of Patent: May 26, 2015

(54) DYNAMIC 911 LOCATION REGISTRATION FOR MOBILE VOIP DEVICE

(71) Applicant: Bandwidth.com, Inc., Raleigh, NC (US)

(72) Inventors: Greg Stephens, Cary, NC (US); Kevin Breault, Denver, CO (US); Jason Shugart, Denver, CO (US)

(73) Assignee: BANDWIDTH.COM, INC, Raleigh, NC (US)

( * ) Notice: Subject to any disclaimer, the term of this patent is extended or adjusted under 35 U.S.C. 154(b) by 0 days.

(21) Appl. No.: 14/337,601

(22) Filed: Jul. 22, 2014

(65) Prior Publication Data

US 2014/0334346 A1 Nov. 13, 2014

(51) Int. Cl.
| | |
|---|---|
| H04W 4/00 | (2009.01) |
| H04W 4/22 | (2009.01) |
| H04W 64/00 | (2009.01) |
| H04L 29/08 | (2006.01) |
| H04L 29/06 | (2006.01) |
| H04M 3/42 | (2006.01) |
| H04M 3/51 | (2006.01) |

(52) U.S. Cl.
CPC .............. *H04W 4/22* (2013.01); *H04W 64/003* (2013.01); *H04L 67/18* (2013.01); *H04L 65/1073* (2013.01); *H04L 67/141* (2013.01); *H04M 3/42357* (2013.01); *H04M 3/5116* (2013.01); *H04M 2242/04* (2013.01); *H04M 2242/30* (2013.01)

(58) Field of Classification Search
None
See application file for complete search history.

(56) References Cited

U.S. PATENT DOCUMENTS

| | | | | |
|---|---|---|---|---|
| 6,233,445 | B1 * | 5/2001 | Boltz et al. | 455/404.2 |
| 8,396,445 | B2 * | 3/2013 | Crawford et al. | 455/404.1 |
| 8,509,729 | B2 * | 8/2013 | Shaw | 455/404.1 |
| 8,594,015 | B2 * | 11/2013 | Dunn et al. | 370/328 |
| 8,929,912 | B1 * | 1/2015 | Chitre et al. | 455/456.1 |
| 2006/0270384 | A1 * | 11/2006 | Sahim et al. | 455/404.2 |
| 2007/0041513 | A1 * | 2/2007 | Gende | 379/37 |
| 2009/0003312 | A1 * | 1/2009 | Velazquez et al. | 370/352 |
| 2009/0097474 | A1 * | 4/2009 | Ray et al. | 370/352 |
| 2009/0215427 | A1 * | 8/2009 | Hawkins | 455/404.2 |
| 2010/0159871 | A1 * | 6/2010 | Tester | 455/404.2 |
| 2010/0329433 | A1 * | 12/2010 | Bushnell | 379/45 |
| 2011/0201299 | A1 * | 8/2011 | Kamdar | 455/404.1 |
| 2011/0206036 | A1 * | 8/2011 | DeWeese | 370/352 |
| 2013/0005294 | A1 * | 1/2013 | Levinson et al. | 455/404.2 |
| 2013/0122851 | A1 * | 5/2013 | Michaelis et al. | 455/404.2 |
| 2014/0067902 | A1 * | 3/2014 | Wang et al. | 709/201 |
| 2014/0241334 | A1 * | 8/2014 | Martin et al. | 370/338 |

* cited by examiner

*Primary Examiner* — Michael J Moore, Jr.
(74) *Attorney, Agent, or Firm* — Gregory Stephens (57) ABSTRACT

Embodiments of the present invention are directed to methods and systems for handling emergency calls from a mobile VoIP device. According to one embodiment, handling an emergency call from a Voice-over Internet Protocol (VoIP) device can comprise registering a physical address associated with the mobile VoIP device, periodically determining a current location of the mobile VoIP device, dynamically updating a current address associated with the mobile VoIP device based on the determined current location of the mobile VoIP device, and initiating an emergency call from the mobile VoIP device, the emergency call selectively using either the registered physical address or the dynamically updated current address.

18 Claims, 7 Drawing Sheets

DYNAMIC 911 LOCATION REGISTRATION FOR MOBILE VOIP DEVICE

BACKGROUND OF THE INVENTION

Embodiments of the present invention relate generally to methods and systems for handling emergency calls and more particularly to handling emergency calls from a mobile Voice-over Internet Protocol (VoIP) device.

Emergency calls placed to 9-1-1 from a fixed circuit switched landline over the Public Switched Telephone Network (PSTN) may be routed to a proper public safety system such as a dispatcher for local fire or police agencies based on a known physical location at which the PSTN landline is installed. Similarly, Voice-over Internet Protocol (VoIP) devices must register a permanent address (or other known physical location) during initial activation of the mobile VoIP device. Emergency calls placed from the device use this registered address to route the call to the appropriate public safety system sometimes known as a Public Safety Answering System (PSAP). This registered address may be updated by the user accessing the VoIP service provider account and editing profile information at any time. However, this is not always done when the user moves or takes the mobile VoIP device to a new location. Therefore, this address may be erroneous in situations in which there is no cellular service and the mobile VoIP device is connected to a WiFi access point that is not at or near the registered address. Hence, there is a need for improved methods and systems for handling emergency calls from a mobile VoIP device.

BRIEF SUMMARY OF THE INVENTION

Embodiments of the present invention are directed to methods and systems for handling emergency calls from a mobile VoIP device. According to one embodiment, handling an emergency call from a Voice-over Internet Protocol (VoIP) device can comprise registering a physical address associated with the mobile VoIP device, periodically determining a current location of the mobile VoIP device, dynamically updating a current address associated with the mobile VoIP device based on the determined current location of the mobile VoIP device, and initiating an emergency call from the mobile VoIP device, the emergency call selectively using either the registered physical address or the dynamically updated current address.

Periodically determining the current location of the mobile VoIP device and dynamically updating the current address associated with the mobile VoIP device comprises obtaining current location data indicating a current physical location of the mobile VoIP device, converting the current location data to the current address associated with the mobile VoIP device, and comparing the current address associated with the mobile VoIP device to the registered address. In response to the current address associated with the mobile VoIP device being different from the registered address, the current address can be substituted for the registered address, sent with the emergency call, and associated and stored with the mobile VoIP device. For example, sending the current address with the emergency call can comprise sending a Short Message Service (SMS) message containing the current address to a VoIP service switching center over an IP connection, the IP connection one of an 802.11 WiFi connection or a cellular IP data connection. In another example, sending the current address with the emergency call can comprise sending a Message Queue Telemetry Transport (MQTT) message containing the current address to a VoIP service switching center over an IP connection, the IP connection one of an 802.11 WiFi connection or a cellular IP data connection. In response to the current address associated with the mobile VoIP device matching the registered address, the registered address can be sent with the emergency call.

Dynamically updating the current address associated with the mobile VoIP device can comprise presenting the current address to a user of the mobile VoIP device and receiving a user selection indicating acceptance or rejection of the presented current address. In response to the user selection indicating acceptance of the presented current address, the current address can be used to place the emergency call and can be stored. In response to the user selection indicating rejection of the presented current address, the registered address can be used to place the emergency call. In other cases, dynamically updating the current address associated with the mobile VoIP device can comprise receiving the current address from a user of the mobile VoIP device and comparing the received current address to Global Positioning System (GPS) data for the mobile VoIP device. In response to the received current address substantially matching the GPS data for the mobile VoIP device, the current address can be to place the emergency call and can be stored. In response to the received current address not substantially matching the GPS data for the mobile VoIP device, the registered address can be used to place the emergency

DETAILED DESCRIPTION OF THE INVENTION

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The term "machine-readable medium" includes, but is not limited to portable or fixed storage devices, optical storage devices, wireless channels and various other mediums capable of storing, containing or carrying instruction(s) and/or data. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Figure 1:
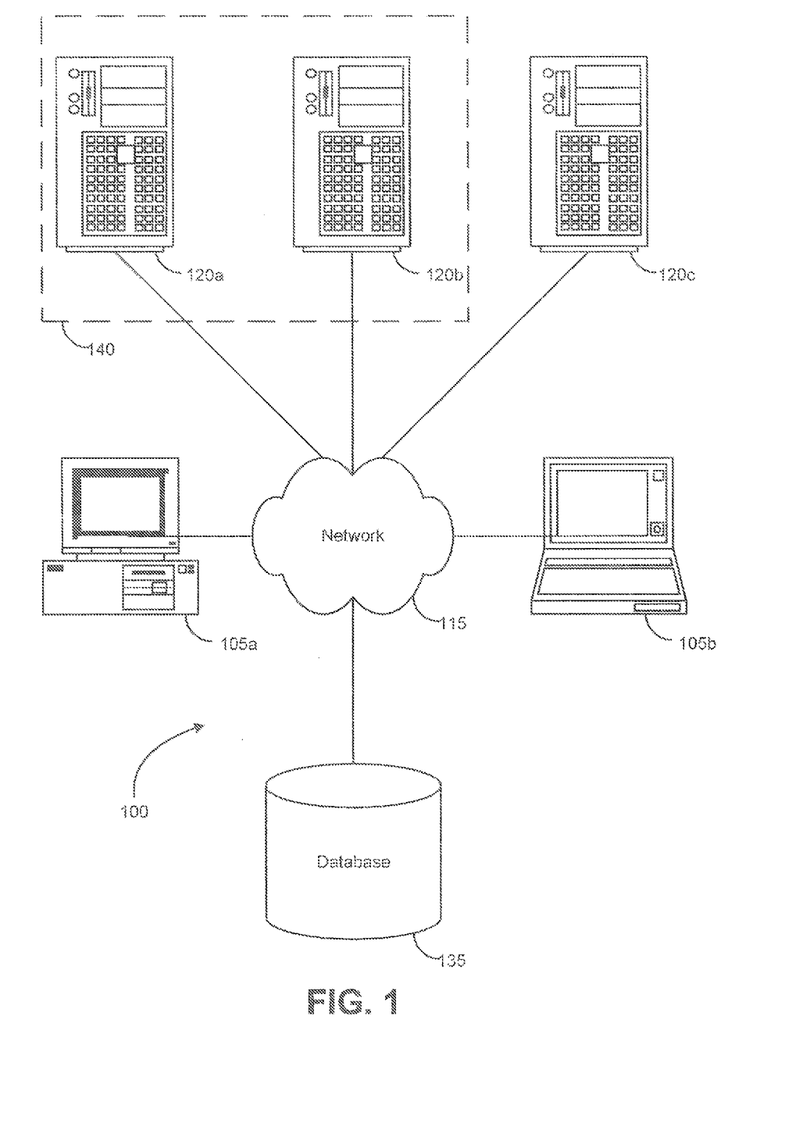
FIG. 1 is a block diagram illustrating components of an exemplary operating environment in which various embodiments of the present invention may be implemented.

FIG. 1 is a system block diagram illustrating components of an exemplary operating environment in which various embodiments of the present invention may be implemented. The system 100 may include one or more user computers 105*a-b* which may be used to operate a client, whether a dedicated application, web browser, etc. The user computers 105*a-b* may be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, a variety of GNU/Linux operating systems). These user computers 105, 110 may also have any of a variety of applications, including one or more development systems, database client and/or server applications, and web browser applications. Alternatively, the user computers 105*a-b* may be any other electronic device, such as a thin-client computer, Internet-enabled mobile telephone, and/or personal digital assistant (PDA), capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network 115 may be any type of network familiar to those skilled in the art that may support data communications using any of a variety of commercially-available protocols, including without limitation TCP/IP, SNA, IPX, AppleTalk, and the like. Merely by way of example, the network 115 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system 100 may also include one or more server computers 120*a-c* which may be general purpose computers and/or specialized server computers (including, merely by way of example, PC servers, UNIX servers, mid-range servers, mainframe computers rack-mounted servers, etc.). One or more of the servers (e.g., 120) may be dedicated to running applications, such as a business application, a web server, application server, etc. Such servers 120 may be used to process requests from user computers 105. The applications may also include any number of applications for controlling access to resources of the servers 120.

A web server may run an operating system including any of those discussed above, as well as any commercially-available server operating systems. The web server may also run any of a variety of server applications and/or mid-tier applications, including HTTP servers, FTP servers, CGI servers, database servers, Java servers, business applications, and the like. The server(s) 120 also may be one or more computers that may be capable of executing programs or scripts in response to the user computers 105, 110. As an example, a server 120 may execute one or more web applications. A web application may be implemented as one or more scripts or programs written in any programming language, such as Java™, C, C# or C++, and/or any scripting language, such as Perl, Python, or TCL, as well as combinations of any programming/scripting languages. The server(s) 120 may also include database servers, including without limitation those commercially available from Oracle®, Microsoft®, Sybase®, IBM® and the like, which may process requests from database clients running on a user computer 105.

In some embodiments, an application server may create web pages dynamically for displaying on an end-user (client) system. The web pages created by the web application server may be forwarded to a user computer 105 via a web server. Similarly, the web server may receive web page requests and/or input data from a user computer and may forward the web page requests and/or input data to an application and/or a database server. Those skilled in the art will recognize that the functions described with respect to various types of servers 120 may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105 or servers 120. Alternatively, it may be remote from any or all of the computers 105 or servers 120, and/or in communication (e.g., via the network 115) with one or more of these. In a particular set of embodiments, the database 135 may reside in a storage-area network ("SAN") familiar to those skilled in the art. Similarly, any necessary files for performing the functions attributed to the computers 105 or servers 120 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
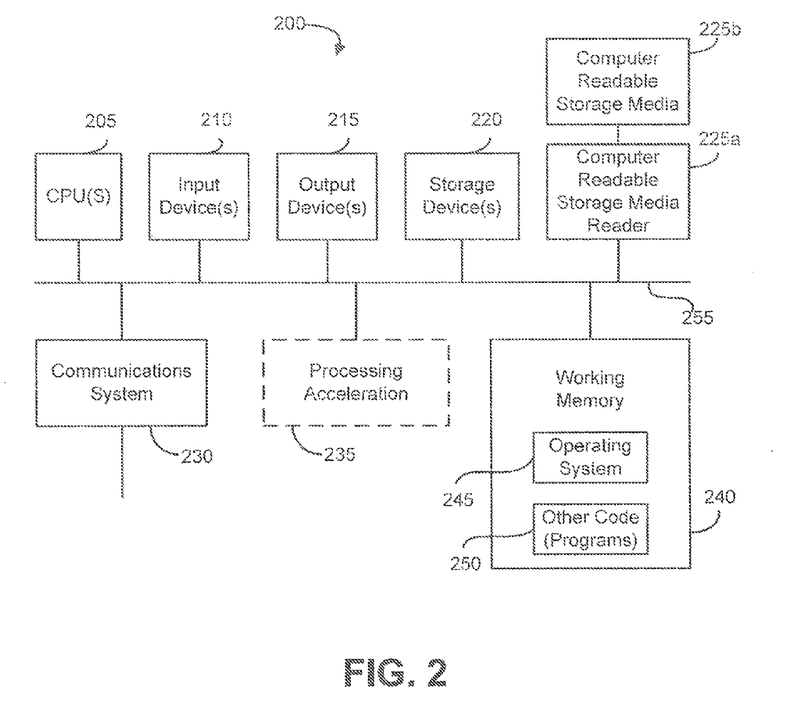
FIG. 2 is a block diagram illustrating an exemplary computer system in which embodiments of the present invention may be implemented.

FIG. 2 illustrates an exemplary computer system 200, in which various embodiments of the present invention may be implemented. The computer system 200 may be used to implement any of the systems 100 described above. The computer system 200 is shown comprising hardware elements that may be electrically coupled via a bus 255. The hardware elements may include one or more central processing units (CPUs) 205, one or more input devices 210 (e.g., a mouse, a keyboard, etc.), and one or more output devices 215 (e.g., a display device, a printer, etc.). The computer system 200 may also include one or more storage devices 220. By way of example, storage device(s) 220 may be disk drives, optical storage devices, solid-state storage device such as a random access memory ("RAM") and/or a read-only memory ("ROM"), which may be programmable, flash-updateable and/or the like.

The computer system 200 may additionally include a computer-readable storage media reader 225a, a communications system 230 (e.g., a modem, a network card (wireless or wired), an infra-red communication device, etc.), and working memory 240, which may include RAM and ROM devices as described above. In some embodiments, the computer system 200 may also include a processing acceleration unit 235, which may include a digital signal processor (DSP), a special-purpose processor and/or the like.

The computer-readable storage media reader 225a may further be connected to a computer-readable storage medium 225b, together (and, optionally, in combination with storage device(s) 220) comprehensively representing remote, local, fixed, and/or removable storage devices plus storage media for temporarily and/or more permanently containing computer-readable information. The communications system 230 may permit data to be exchanged with the network 115 and/or any other computer 105 or server 120 described above with respect to the system 100.

The computer system 200 may also comprise software elements, shown as being currently located within working memory 240, including an operating system 245 and/or other code 250, such as an application program (which may be a client application, web browser, mid-tier application, RDBMS, etc.). It should be appreciated that alternate embodiments of computer system 200 may have numerous variations from that described above. For example, customized hardware may also be used and/or particular elements may be implemented in hardware, software (including portable software, such as applets), or both. Further, connection to other computing devices such as network input/output devices may be employed. Software of computer system 200 may include code 250 for implementing embodiments of the present invention as described herein.

For example, any of the networks, servers, and/or computer described above may be utilized to implement an emergency calling system in which embodiments of the present invention may be implemented. Embodiments of the present invention may be directed to routing and other handling of emergency calls, e.g., 911 calls. More particularly, embodiments of the present invention are directed to handling emergency calls from a mobile Voice-over Internet Protocol (VoIP) device and can include periodically checking a current location of the mobile VoIP device and dynamically updating an address associated with the mobile VoIP device. For example, the mobile VoIP device can periodically check its current location and determine a current address in a variety of different ways. If this current address is different from an address associated with the mobile VoIP device upon registration, i.e., the registered address for the mobile VoIP device, this current address can be recorded and can be used in place of the registered address if an emergency call if placed from that mobile VoIP device. In this way, a more dynamic and more accurate address can be used for routing of the emergency all in case that the mobile VoIP device has been moved from the address to which it was originally registered.

Figure 3:
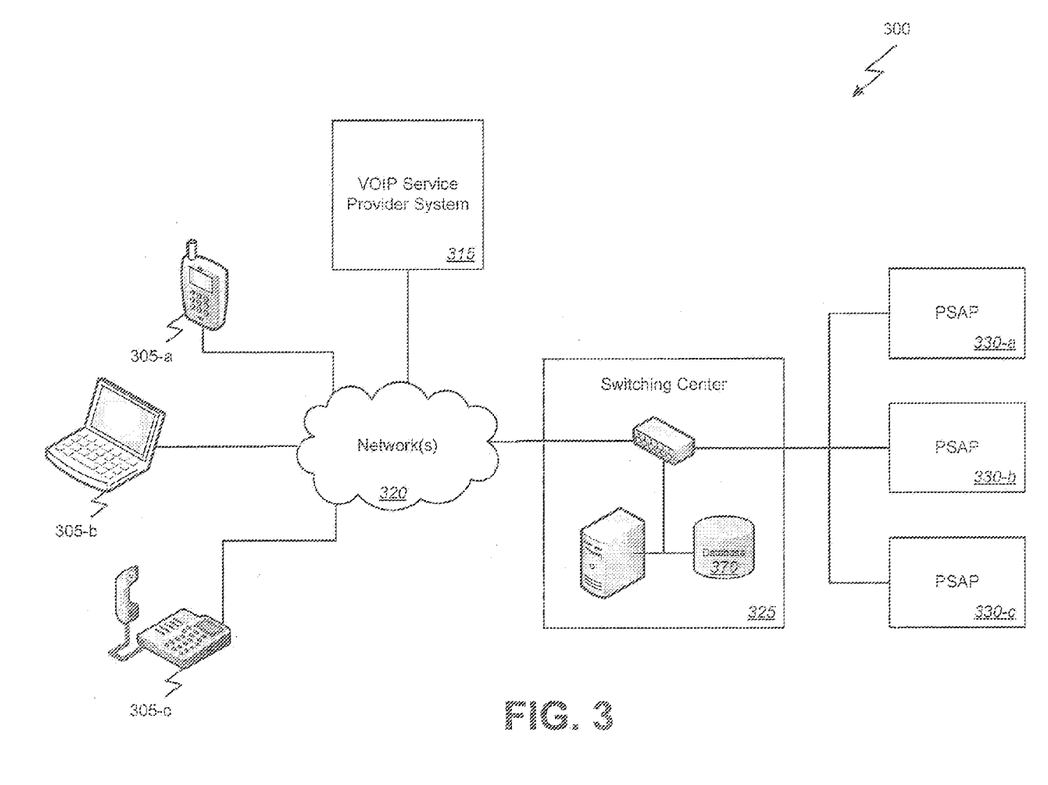
FIG. 3 is a block diagram illustrating elements of an exemplary environment in which emergency call handling may be performed and in which embodiments of the present invention may be implemented.

FIG. 3 is a block diagram illustrating elements of an exemplary environment in which emergency call handling may be performed and in which embodiments of the present invention may be implemented. As illustrated here, the emergency call handling system 300 may include a number of devices 305a-c of various types, each device configured to execute a Voice-over Internet Protocol (VoIP) client application. These VoIP devices 305a-c may be communicatively coupled with one or more networks 320 of various types including but not limited to the Internet and/or any other local area or wide area network for sending and receiving calls, including but not limited to emergency calls, e.g., 911 calls. For example, the system 300 may also include a switching center 325 that may also be communicatively coupled with the VoIP devices 305a-c and networks 320, for example through a telephone network.

As known in the art, the switching center 325 may receive and route calls and other communications to and from VoIP devices 305a-c. In the case of an emergency call, the switching center 325 may determine which of any number of Public Safety Answering Points (PSAPs) 330a-c the emergency call should be routed to based, for example, on the location of the VoIP device and a defined geographic area for which the PSAP 330 is responsible. Generally speaking, this routing can be based on a set of information maintained in a database 370 within the switching center 325 or elsewhere and accessible by the switching center 325. This set of information can include an address associated with each of a set of telephone numbers and may be referenced by the switching center 325 when routing an emergency call from one of the VoIP devices 305a-c to one of the PSAPs 330 as known in the art.

In the cases of mobile VoIP device 305a, the location of the device for routing purposes can be a physical address or known location associated with each mobile VoIP device 305a at the time of registration. This registered address can be maintained on the mobile VoIP device 305a as well as by the VoIP service provider system 315. However, if the mobile VoIP device 305a has been moved since registration, this address may not be correct which can result in emergency calls from that mobile VoIP device 305a being routed to a PSAP 330 that covers a geographic area different from the mobile VoIP device's current location.

Therefore, embodiments of the present invention can also include a process running in the mobile VoIP device 305 that dynamically updates the user's server side and phone side profile with current location data. For example, this application can periodically obtain current location data of mobile VoIP device 305a, e.g., using a Global Positioning System (GPS) receiver of the mobile VoIP device 305a, triangulation with a cellular network, etc., and convert the received location data to a nearest accessible physical address, if possible. The application can then compare this current address to the registered address stored on the mobile VoIP device 305a and server of the VoIP service provider system 315. If this determined current address of the mobile VoIP device 305 is different from the registered address, the application can substitute the current address for the registered address and send the current address to that server of the VoIP service provider system 315 via in-band or out of band signaling (e.g., WiFi, MQTT, text message, etc.). Thus, the application of the mobile VoIP device 305a can dynamically update the address associated with that mobile VoIP device 305a by over-writing the previous address with the new, current address. Then, when an emergency call is made, it can be routed to the appropriate PSAP 330 based on the dynamically updated current address.

While this dynamic update may be performed periodically, e.g., upon the expiration of a pre-defined time period, it may additionally or alternatively be performed upon the initiation of an emergency or other call or upon the occurrence of some other event or trigger. Other variations are also possible in other implementations. For example, the current address may be determined in any of a number of different ways. According to one embodiment, for example, just prior to connecting an emergency call, the application executing on the mobile VoIP device 305a can present a pop-up or other interface containing the address that will be associated with the call and can allow the user to confirm or deny the accuracy of the current address. This may occur when, for instance, the current address does not match the registered address at the time of the emergency call. If confirmed, the system 300 can place the call to the PSAP 330 for that address. If denied, the system 300 can route the call to a different PSAP 330, e.g., the PSAP for the registered address or another location. Additionally or alternatively, the application on the mobile VoIP device 305a can allow the user to manually enter an address, e.g., via text input, voice input, etc. The application can then compare this address to current GPS data for the mobile VoIP device 305a. If the locations indicated by the entered current address and the GPS data are close enough, the application can accept the manually input current address, e.g., for a periodic update, when initiating a call, etc. Other variations are contemplated and considered to be within the scope of the present invention.

Figure 4:
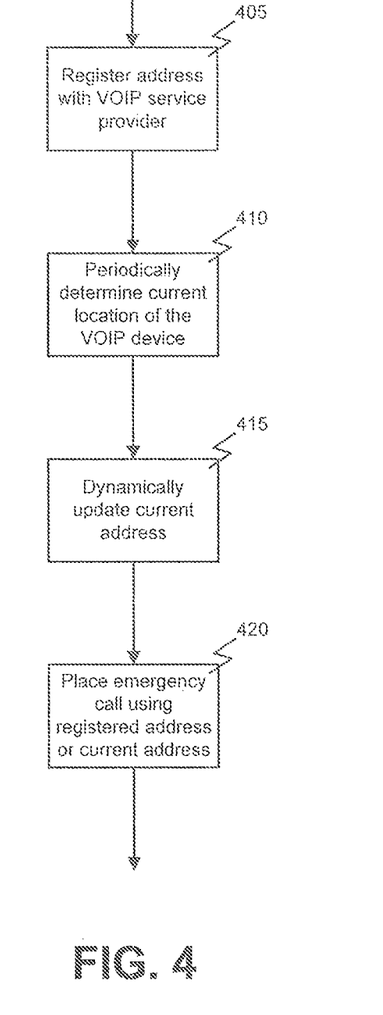
FIG. 4 is a flowchart illustrating a process for handling emergency calls from a mobile VoIP device according to one embodiment of the present invention.

FIG. 4 is a flowchart illustrating a process for handling emergency calls from a mobile VoIP device according to one embodiment of the present invention. As illustrated in this example, handling an emergency call from a mobile VoIP device can comprise registering 405 a physical address associated with the mobile VoIP device. That is, upon registration and/or activation of the mobile VoIP device, the user can be queried, for example through a dialog or other interface presented by the mobile VoIP device or other device used to register the mobile VoIP device, for an address to be associated with that mobile VoIP device. This address can be saved as the registered address and may, in some cases, be used when placing an emergency call from that mobile VoIP device as will be described.

According to one embodiment, a current location of the mobile VoIP device may be periodically determined 410 and a current address associated with the mobile VoIP device may be dynamically updating 415 based on the determined current location of the mobile VoIP device. That is, after the expiration of some predefined time period, upon the user placing an emergency call from the mobile VoIP device, or upon the occurrence of some other event or trigger, the current address of the mobile VoIP device can be determined and, if different from the registered address, might be used instead of the registered address to route the emergency call to the appropriate public safety system. Periodically determining 410 and dynamically updating 415 a current address associated with the mobile VoIP device may be performed in any one or more different ways. Generally speaking, these methods can involve, for example, using a Global Positioning System (GPS) receiver and/or other sensors of the device, to determine the current location and/or address. Additionally or alternatively, the user may be asked to provide an address and/or confirm an address determined by the mobile VoIP device or another system. Additional details of some exemplary processes for periodically determining 410 and dynamically updating 415 a current address associated with the mobile VoIP device will be described below.

When an emergency call is initiated 420 from the mobile VoIP device, the mobile VoIP device can selectively use either the registered physical address or the dynamically updated current address for the emergency call. That is, if the current address is different from the registered address, and perhaps confirmed by the user, it may be used in place of the registered address. Otherwise, if the current address is the same as the registered address, is rejected by the user, or is not available, the registered address may be used. Once selected, either the current address or registered address can be added to the outgoing call, either in-band or out-of-band, by the mobile VoIP device and used by a switching center of VoIP service to select a PSAP to which the call should be routed. For example, the VoIP mobile device may utilize a Short Message Service (SMS) message or a Message Queue Telemetry Transport (MQTT) protocol to convey the current address data from the mobile VoIP device to the VoIP service switching center. The SMS message and/or the MQTT message may be sent to the VoIP service switching center over an IP connection such as, for instance, an 802.11 WiFi access point if currently available or a cellular IP data connection. The VoIP service switching center may then include the current address as it would for any other emergency call for PSAP routing.

Figure 5:
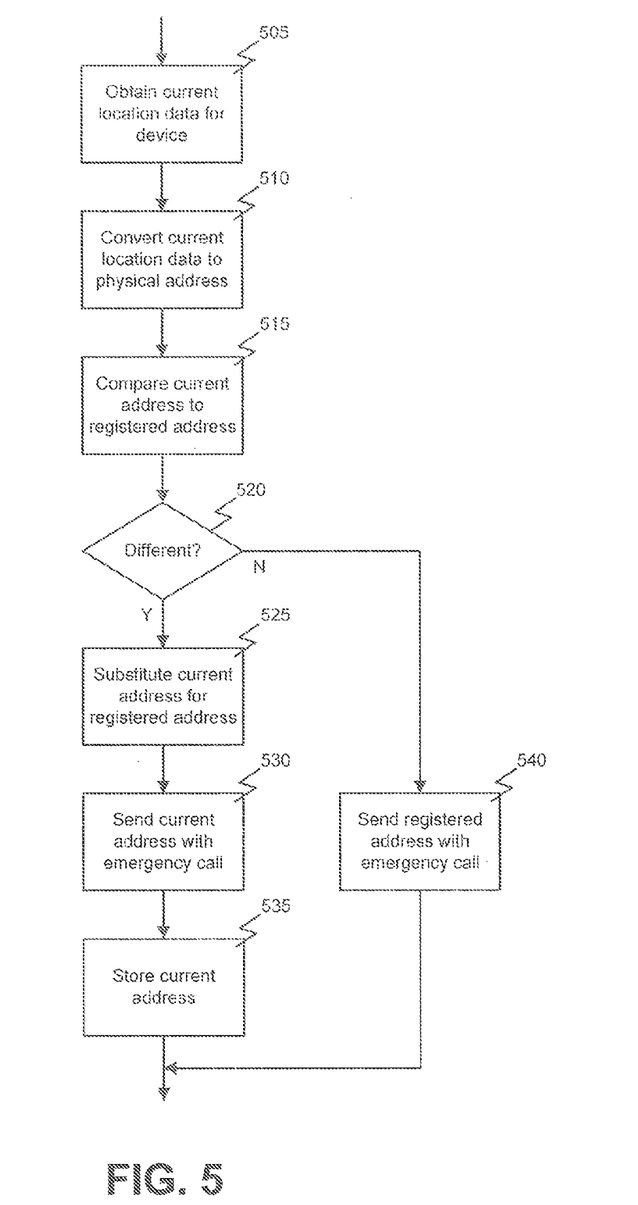
FIG. 5 is a flowchart illustrating a process for dynamic address registration for a mobile VoIP device according to one embodiment of the present invention.

FIG. 5 is a flowchart illustrating a process for dynamic address registration for a mobile VoIP device according to one embodiment of the present invention. As illustrated in this example, periodically determining 410 the current location of the mobile VoIP device and dynamically updating 415 the current address associated with the mobile VoIP device may comprise obtaining 505 current location data indicating a current physical location of the mobile VoIP device. For example, obtaining 505 current location data can comprise obtaining Global Positioning System (GPS) data or other location data for the mobile VoIP device. Other possible location data for the mobile VoIP device can comprise available location data as known in the art including but not limited to a known address or location of a wireless access point used by the mobile VoIP device, a known address or location for another device to which the mobile VoIP device is coupled, etc. The obtained 505 current location data can be converted 510 to the current address associated with the mobile VoIP device. Converting 510 the location data to an address may be performed, for example, by querying a database or service maintaining such information for known addresses.

Once the current location data has been converted 510 to an address, this current address associated with the mobile VoIP device can be compared 515 to the registered address. A determination 520 can then be made as to whether the current address matches the registered address for the mobile VoIP device. In response to determining 520 that the current address associated with the mobile VoIP device is different from the registered address the current address can be substituted 525 for the registered address and can be sent 530 with the emergency call when made. That is, the received current address can be added to the outgoing call, either in-band or out-of-band, by the mobile VoIP device and used by a switching center of VoIP service to select a public safety to which the call should be routed. The current address associated with the mobile VoIP device can also be stored 535 for future use when an emergency call is made and/or for other purposes. In response to determining 520 the current address associated with the mobile VoIP device matches the registered address the registered address can be sent 540 with the emergency call when made.

Figure 6:
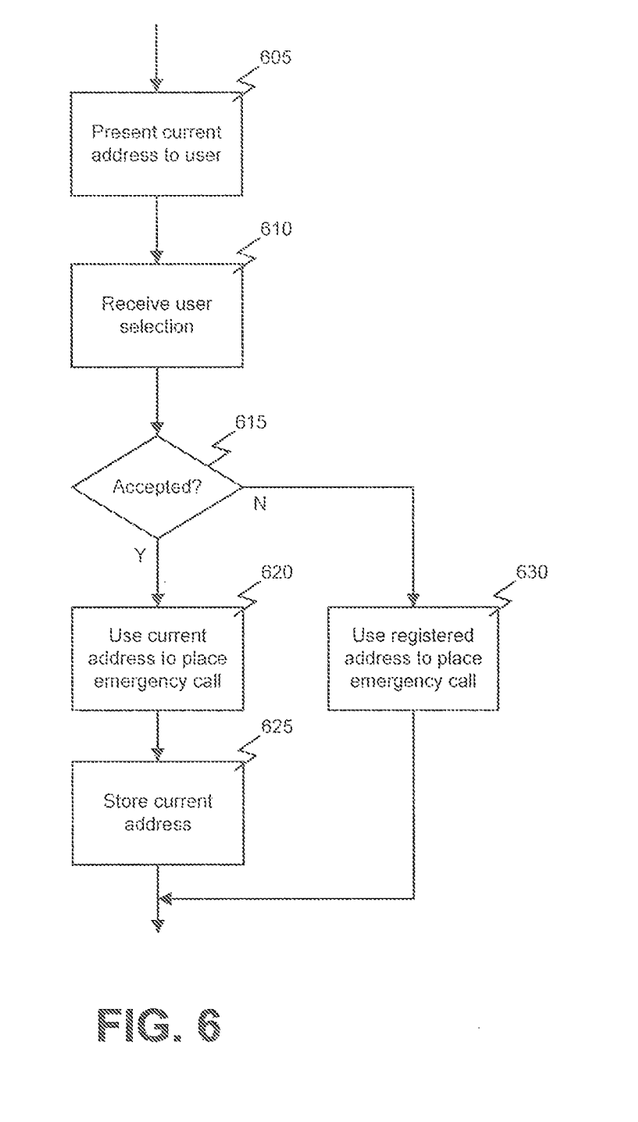
FIG. 6 is a flowchart illustrating an alternative process for determining a location of a mobile VoIP device according to one embodiment of the present invention.

FIG. 6 is a flowchart illustrating an alternative process for determining a location of a mobile VoIP device according to one embodiment of the present invention. As illustrated in this example, dynamically updating 415 the current address associated with the mobile VoIP device can further comprise presenting 605 the current address to a user of the mobile VoIP device and receiving 610 a user selection indicating acceptance or rejection of the presented current address. For example, when the user of the mobile VoIP device attempts to place an emergency call, a pop up dialog or other interface may be presented to the user to display the current address and prompt the user to provide confirmation of that address as being correct, e.g., by clicking or selecting a button or icon, pressing a key, voice command, etc. A determination 615 can then be made as to whether the user has accepted or rejected the presented current address. In response to determining 615 that the user selection indicates acceptance of the presented current address, the current address can be used 620 to place the emergency call. That is, the presented current address can be added to the outgoing call, either in-band or out-of-band, by the mobile VoIP device and used by a switching center or VoIP service to select a PSAP to which the call should be routed. Furthermore, the presented current address can be stored 625 as a new, known current address. In response to determining 615 that the user selection indicates rejection of the presented current address, the registered address or another address can be used 630 to place the emergency call. For example, the user might be prompted to provide an address as described below.

Figure 7:
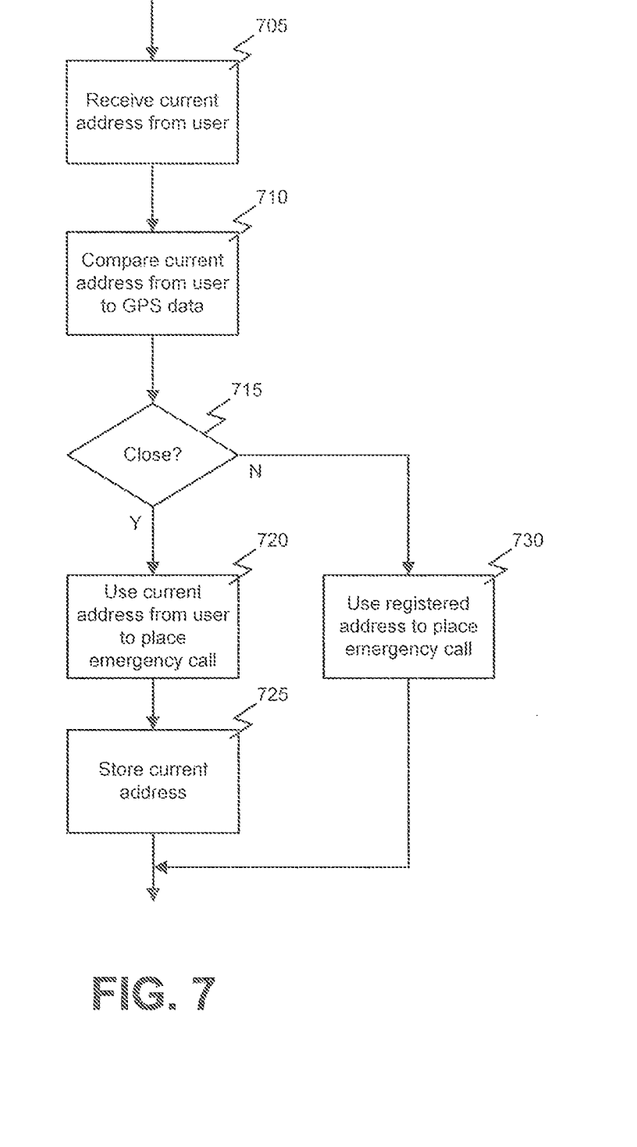
FIG. 7 is a flowchart illustrating another alternative process for determining a location of a mobile VoIP device according to one embodiment of the present invention.

FIG. 7 is a flowchart illustrating another alternative process for determining a location of a mobile VoIP device according to one embodiment of the present invention. As illustrated in this example, dynamically updating 415 the current address associated with the mobile VoIP device can further comprise receiving 705 the current address from a user of the mobile VoIP device. For example, when the user of the mobile VoIP device attempts to place an emergency call, a pop up dialog or other interface may be presented to the user to prompt the user to provide, e.g., via text input, voice command, etc., a current address. The received current address can be compared 710 to Global Positioning System (GPS) data or other location data for the mobile VoIP device. Other possible location data for the mobile VoIP device can comprise available location data as known in the art including but not limited to a known address or location of a wireless access point used by the mobile VoIP device, a known address or location for another device to which the mobile VoIP device is coupled, etc.

Comparing 710 the received address to GPS or other location data can comprise, for example, converting the address to a geographic location, e.g., latitude and longitude coordinates, to facilitate a direct comparison. Such a conversion may be performed, for example, by querying a database or service maintaining such information for known addresses. A determination 715 can then be made as to whether the received address substantially matches the GPS or other location data. A determination 715 of a substantial match can be made, for example, based on the received address falling within a predefined area around or linear distance from the GPS or other location data for the mobile VoIP device. It should be understood that other types of data, methods for performing conversions thereof (if needed), and methods for comparing this data are contemplated and considered to be within the scope of the present invention.

Regardless of exactly how the comparison 710 is made, in response to determining 715 that the received current address substantially matches the GPS data for the mobile VoIP device, the current address can be used 720 to place the emergency call. That is, the received current address can be added to the outgoing call, either in-band or out-of-band, by the mobile VoIP device and used by a switching center of VoIP service to select a PSAP to which the call should be routed. Furthermore, the current address can be stored 725 as a new, known current address. In response to determining 715 the received current address does not substantially match the GPS data for the mobile VoIP device, the registered address can be used 730 to place the emergency call.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for handling an emergency call from a Voice-over Internet Protocol (VoIP) device, the method comprising:
   registering a permanent physical address associated with the mobile VoIP device;
   periodically determining a current physical location of the mobile VoIP device via Global Positioning System (GPS) data;
   converting the current physical location data to a current physical address;
   dynamically updating a the current physical address associated with the mobile VoIP device based on the determined current physical location of the mobile VoIP device including:

presenting the current physical address to a user of the mobile VoIP device; and receiving a user selection indicating acceptance or rejection of the presented current physical address; and initiating an emergency call from the mobile VoIP device, the emergency call selectively using either the registered permanent physical address or the dynamically updated current physical address.

2. The method of claim 1, further comprising, in response to the current physical address being different from the registered permanent physical address:

substituting the current physical address for the registered permanent physical address;

sending the current physical address with the emergency call; and storing the current physical address associated with the mobile VoIP device.

3. The method of claim 2, wherein sending the current physical address with the emergency call further comprises:

sending a Short Message Service (SMS) message containing the current physical address to a VoIP service switching center over an IP connection, the IP connection one of an 802.11 WiFi connection or a cellular IP data connection.

4. The method of claim 2, wherein sending the current physical address with the emergency call further comprises:

sending a Message Queue Telemetry Transport (MQTT) message containing the current physical address to a VoIP service switching center over an IP connection, the IP connection one of an 802.11 WiFi connection or a cellular IP data connection.

5. The method of claim 1, further comprising, in response to the current physical address associated with the mobile VoIP device matching the registered permanent physical address, sending the registered permanent physical address with the emergency call.

6. The method of claim 1, further comprising, in response to the user selection indicating acceptance of the presented current physical address:

using the current physical address to place the emergency call; and storing the current physical address.

7. The method of claim 1, further comprising, in response to the user selection indicating rejection of the presented current physical address, using the registered permanent physical address to place the emergency call.

8. A system comprising:

a processor; and a memory coupled with and readable by the processor and storing therein a set of instructions which, when executed by the processor, causes the processor to handle an emergency call from a Voice-over Internet Protocol (VoIP) device by:

registering a permanent physical address associated with the mobile VoIP device;

periodically determining a current physical location of the mobile VoIP device via Global Positioning System (GPS) data;

converting the current physical location data to a current physical address;

dynamically updating a the current physical address associated with the mobile VoIP device based on the determined current physical location of the mobile VoIP device including:

presenting the current physical address to a user of the mobile VoIP device;

receiving a user selection indicating acceptance or rejection of the presented current physical address;

in response to the user selection indicating acceptance of the presented current physical address, using the current physical address to place the emergency call, and storing the current physical address; and in response to the user selection indicating rejection of the presented current physical address, using the registered permanent physical address to place the emergency call; and initiating an emergency call from the mobile VoIP device, the emergency call selectively using either the registered permanent physical address or the dynamically updated current physical address.

9. The system of claim 8, wherein in response to the current physical address associated with the mobile VoIP device being different from the registered permanent physical address, substituting the current physical address for the registered permanent physical address, sending the current physical address with the emergency call, and storing the current physical address associated with the mobile VoIP device; and in response to the current physical address associated with the mobile VoIP device matching the registered permanent physical address, sending the registered permanent physical address with the emergency call.

10. The system of claim 9, wherein sending the current physical address with the emergency call further comprises:

sending a Short Message Service (SMS) message containing the current physical address to a VoIP service switching center over an IP connection, the IP connection one of an 802.11 WiFi connection or a cellular IP data connection.

11. The system of claim 9, wherein sending the current physical address with the emergency call further comprises:

sending a Message Queue Telemetry Transport (MQTT) message containing the current physical address to a VoIP service switching center over an IP connection, the IP connection one of an 802.11 WiFi connection or a cellular IP data connection.

12. A non-transitory computer-readable memory comprising a set of instructions stored therein which, when executed by a processor, causes the processor to handle an emergency call from a Voice-over Internet Protocol (VoIP) device by:

registering a permanent physical address associated with the mobile VoIP device;

periodically determining a current physical location of the mobile VoIP device via Global Positioning System (GPS) data;

converting the current physical location data to a current physical address;

dynamically updating a the current physical address associated with the mobile VoIP device based on the determined current physical location of the mobile VoIP device including:

presenting the current physical address to a user of the mobile VoIP device;

receiving a user selection indicating acceptance or rejection of the presented current physical address;

in response to the user selection indicating acceptance of the presented current physical address, using the current physical address to place the emergency call, and storing the current physical address; and in response to the user selection indicating rejection of the presented current physical address, using the registered permanent physical address to place the emergency call; and initiating an emergency call from the mobile VoIP device, the emergency call selectively using either the registered permanent physical address or the dynamically updated physical current address.

13. The non-transitory computer-readable memory of claim 12, wherein
in response to the current physical address associated with the mobile VoIP device being different from the registered permanent physical address substituting the current physical address for the registered permanent physical address, sending the current physical address with the emergency call, and storing the current physical address associated with the mobile VoIP device; and
in response to the current physical address associated with the mobile VoIP device matching the registered permanent physical address, sending the registered permanent physical address with the emergency call.

14. The non-transitory computer-readable memory of claim 13, wherein sending the current physical address with the emergency call further comprises:
sending a Short Message Service (SMS) message containing the current physical address to a VoIP service switching center over an IP connection, the IP connection one of an 802.11 WiFi connection or a cellular IP data connection.

15. The non-transitory computer-readable memory of claim 13, wherein sending the current physical address with the emergency call further comprises:
sending a Message Queue Telemetry Transport (MQTT) message containing the current physical address to a VoIP service switching center over an IP connection, the IP connection one of an 802.11 WiFi connection or a cellular IP data connection.

16. A method for handling an emergency call from a Voice-over Internet Protocol (VoIP) device, the method comprising:
registering a physical address associated with the mobile VoIP device;
periodically determining a current location of the mobile VoIP device;
dynamically updating a current address associated with the mobile VoIP device based on the determined current location of the mobile VoIP device;
presenting the current address to a user of the mobile VoIP device; and
receiving a user selection indicating acceptance or rejection of the presented current address; and
initiating an emergency call from the mobile VoIP device, the emergency call using either the registered physical address or the dynamically updated current address based on the received user selection.

17. A system comprising:
a processor; and
a memory coupled with and readable by the processor and storing therein a set of instructions which, when executed by the processor, causes the processor to handle an emergency call from a Voice-over Internet Protocol (VoIP) device by:
registering a physical address associated with the mobile VoIP device;
periodically determining a current location of the mobile VoIP device;
dynamically updating a current address associated with the mobile VoIP device based on the determined current location of the mobile VoIP device;
presenting the current address to a user of the mobile VoIP device; and
receiving a user selection indicating acceptance or rejection of the presented current address; and
initiating an emergency call from the mobile VoIP device, the emergency call using either the registered physical address or the dynamically updated current address based on the received user selection.

18. A non-transitory computer-readable memory comprising a set of instructions stored therein which, when executed by a processor, causes the processor to handle an emergency call from a Voice-over Internet Protocol (VoIP) device by:
registering a physical address associated with the mobile VoIP device;
periodically determining a current location of the mobile VoIP device;
dynamically updating a current address associated with the mobile VoIP device based on the determined current location of the mobile VoIP device;
presenting the current address to a user of the mobile VoIP device; and
receiving a user selection indicating acceptance or rejection of the presented current address; and
initiating an emergency call from the mobile VoIP device, the emergency call using either the registered physical address or the dynamically updated current address based on the received user selection.

* * * * *